United States Patent
Moriki et al.

[11] Patent Number: 6,117,466
[45] Date of Patent: Sep. 12, 2000

[54] FORMED CHIPS AND METHOD OF PRODUCTION THEREOF

[75] Inventors: Koichi Moriki; Kumiko Tanaka; Shoichi Moriya, all of Yokohama, Japan

[73] Assignee: Morinaga & Co., Ltd., Tokyo, Japan

[21] Appl. No.: 09/214,850

[22] PCT Filed: Mar. 12, 1998

[86] PCT No.: PCT/JP98/01040

§ 371 Date: Jan. 14, 1999

§ 102(e) Date: Jan. 14, 1999

[87] PCT Pub. No.: WO98/51166

PCT Pub. Date: Nov. 19, 1998

[30] Foreign Application Priority Data

May 14, 1997 [JP] Japan ................................. 9-139396

[51] Int. Cl.[7] ............................. A23L 1/216; A21D 13/00
[52] U.S. Cl. ........................ 426/144; 426/439; 426/560; 426/808
[58] Field of Search .................... 426/144, 637, 426/439, 808, 560

[56] References Cited

U.S. PATENT DOCUMENTS

| | | | |
|---|---|---|---|
| 2,769,715 | 11/1956 | Stahmer | 99/100 |
| 3,956,517 | 5/1976 | Curry et al. | 426/502 |
| 4,650,684 | 3/1987 | Penrose | 426/144 |
| 4,931,303 | 6/1990 | Holm et al. | 426/549 |
| 4,933,194 | 6/1990 | Barry et al. | 426/144 |
| 4,973,481 | 11/1990 | Hunt et al. | 426/144 |
| 4,994,295 | 2/1991 | Holm et al. | 426/549 |

FOREIGN PATENT DOCUMENTS

| | | |
|---|---|---|
| 0324460A2 | 7/1989 | European Pat. Off. . |
| 087606A2 | 9/1990 | European Pat. Off. . |
| 60-172269 | 9/1985 | Japan . |
| 61-282719 | 12/1986 | Japan . |
| 1-215257 | 8/1989 | Japan . |
| 2-261357 | 10/1990 | Japan . |
| 4-503009 | 6/1992 | Japan . |
| 7327628 | 12/1995 | Japan . |
| 1 331 042 | 9/1973 | United Kingdom . |
| 2284973 | 12/1994 | United Kingdom . |
| WO90/08479 | 8/1990 | WIPO . |

*Primary Examiner*—Nina Bhat
*Attorney, Agent, or Firm*—Smith, Gambrell & Russell, LLP

[57] ABSTRACT

Using a dough prepared by using a material containing at least 50% by weight ratio as dried of a preliminarily gelatinized starch material, a sheet in a predetermined configuration wherein grooves which reach the edge of the sheet are formed on at least one side of the sheet, is formed. The thus obtained sheet having the grooves on at least its one side, is placed on a steel band or a mesh band so that the grooves are located downward, and baked by an oven, to obtain fabricated chips. The fabricated chips contain a low oil and fat content since baked by an oven, and have no defects in the appearance such as partially raised portions and random blisters since they have the grooves which reach the edge on at least one side.

11 Claims, 3 Drawing Sheets

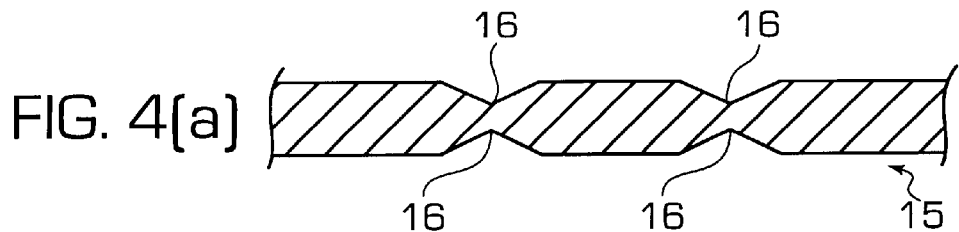
FIG. 4(a)
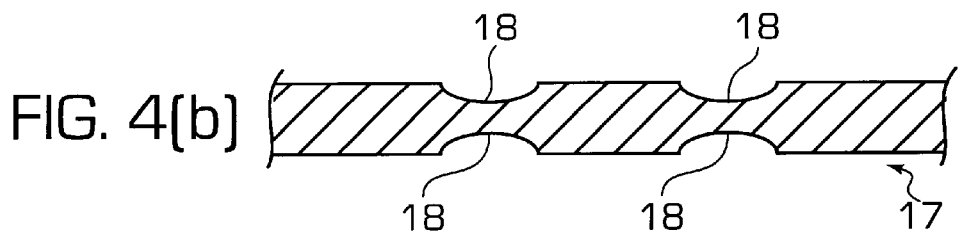
FIG. 4(b)
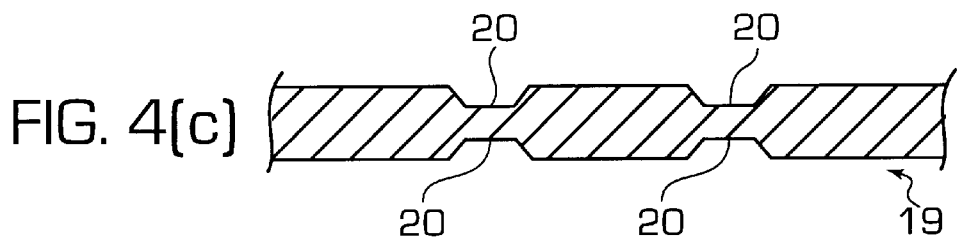
FIG. 4(c)
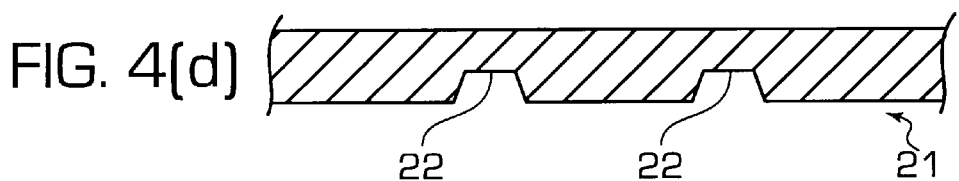
FIG. 4(d)
FIG. 5
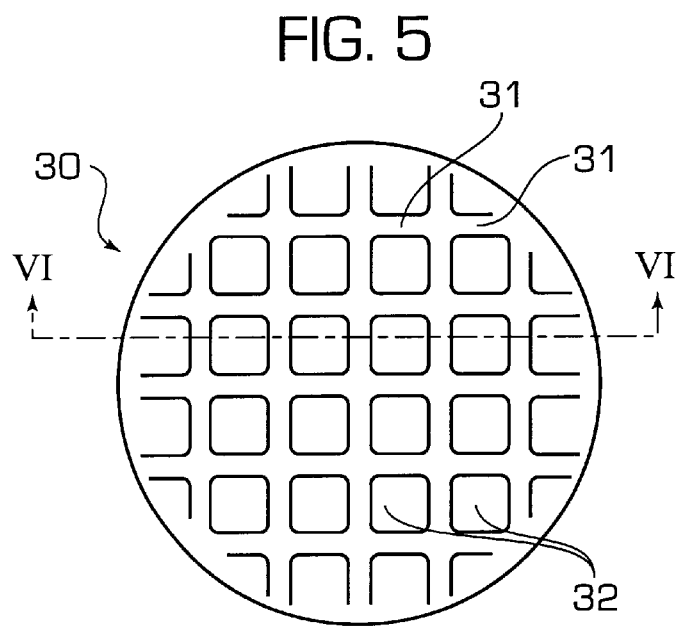

6,117,466

FORMED CHIPS AND METHOD OF PRODUCTION THEREOF

This application is a 371 of PCT/JP98/01040 filed Mar. 12, 1998.

TECHNICAL FIELD

The present invention relates to fabricated chips which are produced by baking a sheet-like dough prepared from a starting material which contains at least 50% by weight ratio as dried of a preliminarily gelatinized starch material, by an oven, and a method for producing them.

BACKGROUND OF TECHNOLOGY

Potato chips have been enjoyed as a typical popular snack food. As potato chips, real potato chips obtainable by slicing and frying potatoes, and fabricated potato chips obtainable by shaping a dough which contains a dried potato such as potato flakes or potato powder as a main material, into a sheet-like configuration, and then frying it or baking it by an oven, have been known.

On the other hand, in recent years, snack foods containing a little fat and oil, have attracted attention. In producing such low fat snacks, it is easier to produce them by putting an oil on baked or puffed ones, rather than frying. Potato chips have been usually produced by frying. However, in the U.S.A. or the like, fabricated potato chips which contain a little fat and oil, obtainable by baking by an oven, have been produced.

FIG. 7 is a diagrammatic view of an oven for baking sheet-like doughs. In this figure, 1 is a steel band conveyer or a mesh band conveyer, and 2 is an oven body having heaters 3 disposed at the upper and lower portions of the conveyer 1. The dough 4 is placed on the conveyer 1 and introduced into the oven body 2, then baked by heaters 3 disposed at the upper and lower portions of the conveyer 1, and taken out.

However, when a sheet-like dough which contains a dried potato as a main material, is baked by an oven having a steel band conveyer, the following problems have been pointed out.

Namely, in FIG. 8, 5 is a steel band, and 4 is a sheet-like dough baked thereon. When a shaped dough is baked on a steel band 5, air remains between the dough 4 and the band 5, and the air does not run out during the baking and is expanded by heating, thereby partially raising the dough 4. Since the partially raised portion 4a is away from the band 5, heat conduction is remarkably poor, the moisture is hardly removed and the color turns white. Further, this partially raised portion 4a is susceptible to cracking. Furthermore, if the dough is baked until the moisture in the partially raised portion 4a is completely removed, other portions will be burnt. Accordingly, in any case, there is a problem that the market value becomes remarkably low.

Further, when a sheet-like dough containing a dried potato as a main material, is baked by an oven having a mesh band conveyer, there have been the following problems.

Namely, a film through which moisture hardly permeates, is formed on the surface of a sheet-like dough during the baking, and the moisture evaporated in the dough can not run out, and as shown in FIG. 9, baked fabricated chips 6 are partially hollowed, whereby blisters 6a are formed. Since the blisters 6a are formed random in various sizes, the appearance becomes bad, uniform products can not be produced, and the strength becomes remarkably low.

In order to solve such problems, there have been known products obtained by making pinholes on a sheet in a predetermined interval, and baking it while removing the air through the pinholes. Namely, in the case of using a steel band, the air between the dough and the steel band is removed through the pinholes to prevent the partial raising, and in the case of using a mesh band, the moisture evaporated in the dough is allowed to run out through the pinholes to prevent the formation of hollowed products.

However, to obtain the above effects sufficiently, it is necessary to form a lot of pinholes, and as a result, the product has an appearance with incongruity as a snack food, and the strength deteriorates, such being problematic. For example, with fabricated potato chips produced in the U.S.A. by use of an oven, since pinholes formed thereon, somewhat incongruity is felt as a snack and a number of cracking are seen.

DISCLOSURE OF THE INVENTION

Accordingly, it is an object of the present invention to provide low-fat potato chips obtainable by baking with an oven, which is free from defects in appearance such as partial raising or blisters during the baking, and a method for production thereof.

To accomplish the above object, the present invention provides fabricated chips which are obtainable by shaping a dough as a starting material which contains at least 50% by weight ratio as dried of a preliminarily gelatinized starch material, into a sheet-like configuration, followed by baking by an oven, which is characterized in that on at least one side of the sheet, grooves which reach the edge of the sheet are formed in a predetermined interval.

With the fabricated chips of the present invention, by forming grooves on at least one side of the sheet, the formation of partially raised portion or the random formation of blisters at the time of baking, can be prevented, and it is possible to obtain a product with good appearance suitable for a snack food and a uniform configuration. Further, since the grooves reach the edge of the sheet, especially when a dough is placed on a steel band conveyer for baking, the air readily runs out through the grooves and the formation of blisters at the edge portion is prevented, whereby the strength is improved. Moreover, by forming grooves on the surface of the sheet, the sheet tends to be broken at the groove portion and light texture sensation can thereby be obtained.

With a preferred embodiment of the fabricated chips of the present invention, the grooves have a width of from 0.5 to 12 mm and a depth of from 0.2 to 3.0 mm; the portions having no grooves thereon, have a width of at most 17 mm; and the groove portions have a thickness of from 0.3 to 2 mm In this preferred embodiment, the above effects can further be improved, wherein the formation of partially raised portion or the random formation of blisters at the time of baking, can be prevented, and the sheet tends to be broken at the groove portions and light texture sensation can thereby be obtained. If the width of the groove is less than 0.5 mm, the action of allowing the air or vapor to run out can not sufficiently be obtained at the time of baking, and if it exceeds 12 mm, the strength tends to be low. Further, if the depth of the groove is less than 0.2 mm, the action of allowing the air or vapor to run out can not sufficiently be obtained, and if it exceeds 3 mm, the thickness of the entire product becomes so thick that rigid texture sensation is given. Furthermore, if the width at the portion having no grooves thereon, exceeds 17 mm, the action of allowing the air or vapor to run out can not sufficiently be obtained, and the effect of giving light texture sensation tends to be poor. Moreover, if the thickness at the groove portion is less than 0.3 mm, adequate strength can not be obtained and the product is thereby susceptible to cracking, and if it exceeds 2 mm, the action of allowing the vapor to run out can not sufficiently be obtained, and rigid texture sensation is given.

In further preferred embodiment of the present invention, the portion between the grooves is expanded and the inside thereof becomes hollow.

Such fabricated chips can be prepared especially when the sheet is placed on a mesh conveyer for baking, wherein the portion between the grooves is in a hollow state like a bamboo or straw blind, and light texture can thereby be obtained when chewing them.

Further, one of the methods for producing the fabricated chips of the present invention, is a method which comprises preparing a dough from a starting material which contains at least 50% by weight ratio as dried of a preliminarily gelatinized starch material, and shaping this dough into a sheet of a predetermined configuration such that grooves which reach the edge of the sheet are formed on at least one side of the sheet in a predetermined interval, and placing the sheet on a steel band such that the side having the grooves formed is located downward, followed by baking it by an oven.

In this method, by forming grooves which reach the edge of the sheet are formed on at least one side of the sheet in a predetermined interval, the air remaining in the area between the sheet and the steel band is allowed to run out through the grooves, whereby the formation of the partially raised portion at the time of baking, can be prevented.

Further, another method for producing the fabricated chips of the present invention, is a method which comprises preparing a dough from a starting material which contains at least 50% by weight ratio as dried of a preliminarily gelatinized starch material, and shaping this dough into a sheet of a predetermined configuration such that grooves which reach the edge of the sheet are formed on at least one side of the sheet in a predetermined interval, and placing the sheet on a mesh band, followed by baking it by an oven.

In this method, since the thickness of the sheet becomes thin at the groove portion, a film due to baking is hardly formed at that portion, and the moisture evaporated in the sheet can readily run out through that portion, whereby the random formation of blisters can be prevented, and it is possible to obtain a product with a uniform appearance wherein only the portion between the grooves is made hollow and the sheet is expanded like a bamboo or straw blind.

In a preferred embodiment of the method for producing the fabricated chips of the present invention, the width of the groove is from 0.5 to 12 mm and the depth thereof is from 0.2 to 1.5 mm, and the width of the portion having no grooves thereon is at most 17 mm.

In this embodiment, it is possible to more securely prevent the partial raising when a steel band conveyer is used, or random blisters when a mesh band conveyer is used. If the width of the groove is less than 0.5 mm, the action of allowing the air or vapor to run out, can not sufficiently be obtained, and if it exceeds 12 mm, the strength tends to be low. Further, if the depth of the groove is less than 0.2 mm, the action of allowing the air or vapor to run out, can not sufficiently be obtained, and if it exceeds 1.5 mm, the entire thickness is so thick that rigid texture sensation is given.

Furthermore, if the width of the portion having no grooves thereon exceeds 17 mm, the action of allowing the air or vapor to run out, can not sufficiently be obtained.

In a further preferred embodiment of the method for producing the fabricated chips of the present invention, the thickness of the sheet at the groove portion is from 0.1 to 0.8 mm.

In this embodiment, when the sheet is baked using a mesh band conveyer, it is possible to more securely obtain the action and effect of the present invention that the vapor inside can run out through the groove portion and a product having an appearance such that the portion between the grooves is expanded like a bamboo or straw blind. If the thickness at the groove portion is less than 0.1 mm, adequate strength can not be obtained, and if it exceeds 0.8 mm, the above action and effect can not sufficiently be obtained.

BRIEF DESCRIPTION OF THE DRAWINGS

FIGS. 4(a–d) is a cross-sectional view showing various examples wherein the configuration of the grooves of the dough sheet is modified.

FIG. 5 is a plan view showing another mode of fabricated chips of the present invention.

BEST MODE FOR CARRYING OUT THE INVENTION

Figure 1:
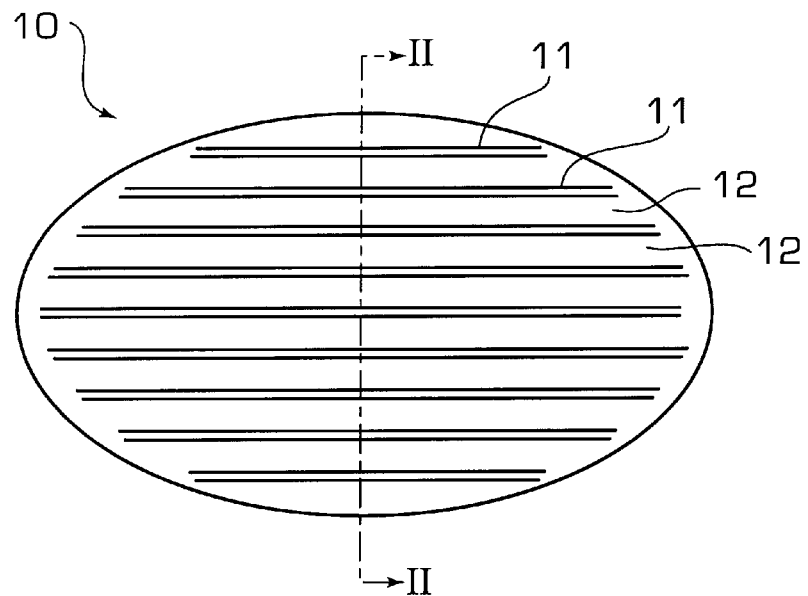
FIG. 1 is a plan view showing a mode of fabricated chips of the present invention.

In the present invention, as the dough material, one which contains at least 50% by weight ratio as dried of a preliminarily gelatinized starch material, is used. The preliminarily gelatinized starch material means ones obtained by cooking a starting material containing a starch material as a main component, followed by drying, for example, potato flakes, pre-cooked waxy rice powder or drum dried α-waxy corn starch; or non-dried ones obtained only by cooking, for example, cooked potatoes or pumpkin cooked and formed in a paste. When the content of the preliminarily gelatinized starch material in the dough is less than 50% by weight ratio as dried, a problem is brought about that the taste of the chips becomes to give an unpleasant flavor as raw cereal.

As sub materials for the dough material, a raw starch material, fat and oil such as shortening, seasonings such as sugar, salt or curry powder, a paste or an extract of vegetables or fruits such as beefsteak plant, carrot or apple, a meat extract, a fish and shellfish extract, dietary fibers, a calcium material, vitamins, flavors, colorants, etc. may appropriately be used.

A dough is prepared by adding water to a mixture of these materials and blending them. With respect to the amount of water to be added, when the dried weight of the mixture of these materials is taken as 100 parts by weight, water is preferably from 60 to 140 parts by weight. If the added amount is less than the above range, the texture sensation of the chip becomes rigid, and if it exceeds the above range, the shaping step becomes remarkably hard by the stickiness of the dough, such being problematic.

This material dough is compressed and extended by, for example, pressure rolls to shape it in a sheet-like form of a predetermined thickness. At that time, at least one of pressure rolls which is compressed to one surface of the sheet, is a roller provided with protuberances (in other words, one provided with grooves), whereby grooves are formed by the above protuberances on the surface of the sheet in a predetermined interval. By stamping the sheet into a desired configuration such as circular or oval, a sheet having grooves which reach the edge of the sheet, formed in a predetermined interval, can be obtained.

The sheet thus obtained is then baked by an oven. When an oven employing a steel band conveyer is used, the sheet is placed on the steel band so that the grooves of the sheet would be located downward, followed by baking. By doing so, the air remaining in the area between the sheet and the steel band is allowed to run out through the grooves, whereby the formation of the partially raised portions can be prevented and it is possible to produce a product having a uniform brown marks with a uniform configuration.

Further, when an oven employing a mesh band conveyer is used, the sheet may be mounted in any direction on the mesh band. With the mesh band, a film through which the moisture hardly permeates is formed by baking on the surface of the sheet. However, by providing the above grooves, the thickness at the groove portion is thin, whereby the above film is hardly formed at that portion, and the moisture evaporated in the dough is allowed to run out through this portion, and random formation of blisters can thereby be prevented.

Figure 2:
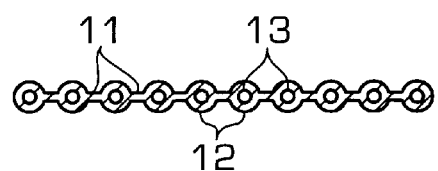
FIG. 2 is a cross-sectional view taken along the arrow line II—II in FIG. 1.

In FIGS. 1 and 2, a mode of the fabricated chips obtainable by the present invention is shown. FIG. 1 is a plan view, and FIG. 2 is a cross-sectional view taken along the arrow line II—II in FIG. 1.

Fabricated chips 10 have an ellipse configuration in a plan view, and on its both sides, parallel grooves 11 which extend from one edge to another edge are formed along the longitudinal direction. A portion 12 between the grooves 11, has a configuration that is expanded in a bamboo or straw blind shape wherein the inside is hollow 13. The fabricated chips 10 give a light texture sensation when chewing them by the portion 12 expanded in a bamboo or straw blind shape.

Figure 3:
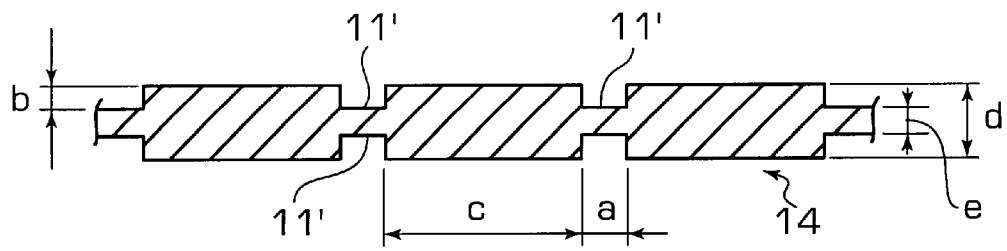
FIG. 3 is a cross-sectional view of a dough sheet for producing the same fabricated chips.

The above fabricated chips 10 is obtained by baking the dough sheet of a cross-sectional configuration as shown in FIG. 3 by a mesh band oven. This dough sheet 14 has grooves 11' on its both sides. In this case, preferably, with the groove 11', the width a is from 0.5 to 12 mm and the depth b is from 0.2 to 1.5 mm, and the width c of the portion having no grooves 11' thereon is preferably at most 17 mm. Further, preferably, with the dough sheet 14, the thickness d of the portion having no grooves 11' thereon is from 0.5 to 3.8 mm, and the thickness e at the portion of the groove 11' is from 0.1 to 0.8 mm. When the dough sheet of this configuration is baked, the depth b of the groove 11' is from 0.2 to 3 mm and the thickness e at the portion of the groove 11' is from 0.3 to 2 mm.

FIG. 4 shows other examples having different shapes of grooves formed on the dough sheet, respectively. In the dough sheet 15 as shown in FIG. 4(a), grooves 16 having a V-shape cross section are formed on both sides. In the dough sheet 17 as shown in FIG. 4(b), grooves 18 having a circular arc cross section are formed on both sides. In the dough sheet 19 as shown in FIG. 4(c), grooves 20 having a trapezoid cross section are formed on both sides. In the dough sheet 21 as shown in FIG. 4(d), grooves 22 having a trapezoid cross section are formed on only one side of the sheet. In the present invention, the width of the groove means the entire width of the portion which forms the recess of the groove.

Figure 6:
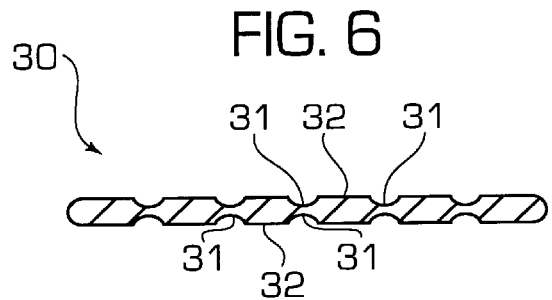
FIG. 6 is a cross-sectional view taken along the arrow line VI—VI in FIG. 5.
Figure 7:
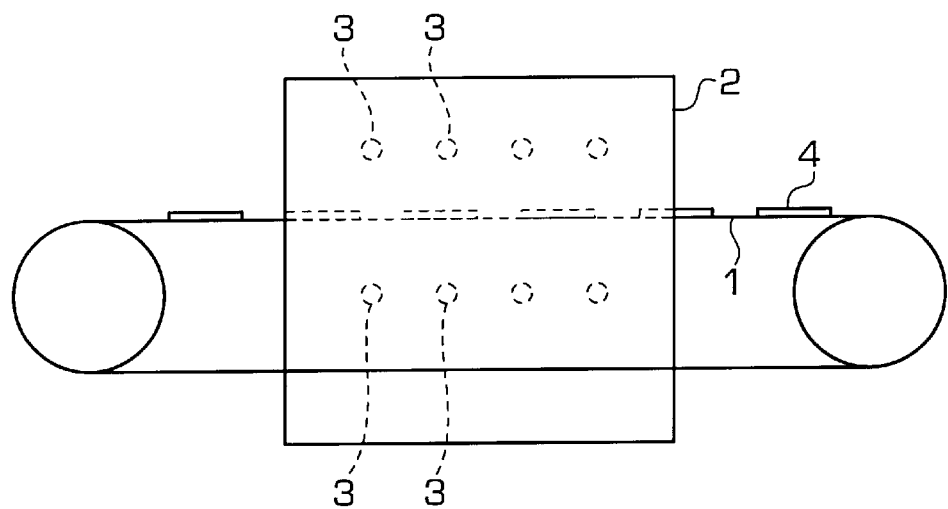
FIG. 7 is a schematic view showing an oven for baking a sheet-like dough.
Figure 8:
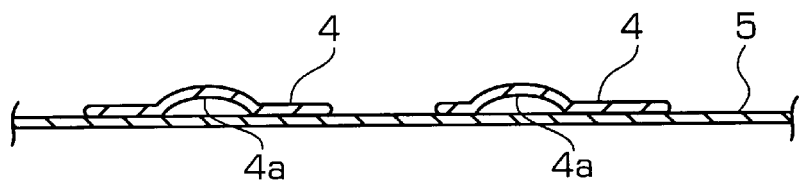
FIG. 8 is a cross-sectional view showing a state where a dough sheet is baked on a steel band by a conventional method.
Figure 9:
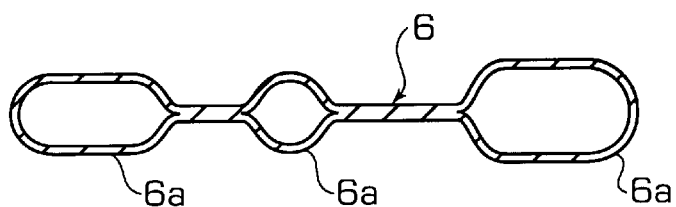
FIG. 9 is a cross-sectional view showing a state where a dough sheet is baked on a mesh band by a conventional method.

FIGS. 5 and 6 show a mode of fabricated chips obtainable by the present invention. FIG. 5 is a plan view and FIG. 6 is a cross-sectional view taken along the arrow line VI—VI in FIG. 5.

Fabricated chips 30 have a circular configuration in a plan view, and on its both sides, check patterned grooves 31 which extend from one edge to another edge are formed. The portion 32 surrounded by the grooves 31 have an embosslike raised configuration. The fabricated chips 30 are obtained by baking a dough sheet having the above check patterned grooves on its both sides, by an oven. As mentioned above, as the grooves which reach the edges of the sheet, various configurations may be employed.

Hereinafter, the present invention will be described with reference to examples.

EXAMPLE 1

The materials to be incorporated as indicated in Table 1 were put in a high-speed mixer, and mixed at 1,000 rpm for 3 minutes to obtain a dough.

TABLE 1

| Potato flakes | 90 | parts by weight |
| Potato starch | 10 | parts by weight |
| Shortening | 3 | parts by weight |
| Sugar | 1 | part by weight |
| Salt | 0.5 | part by weight |
| Water | 90 | parts by weight |

The dough thus prepared was formed into a sheet having a thickness of 1.5 mm by a three-roll sheeter. A flat roll was combined with a grooved roll with grooves having a depth of 0.4 mm and a width of 2 mm, with the pitch between the centers of grooves being 5 mm, so that the flat roll was disposed at the upper portion, the grooved roll was disposed at the lower portion, and the roll gap was adjusted to be 0.3 mm, and then the above sheet was passed between the rolls, followed by stamping with a circular cutter for shaping. After shaping, the thick portion of the sheet was 1.1 mm and the thin portion was 0.6 mm.

By baking the sheet under roasting conditions at 200° C. for 5.5 minutes employing a steel band oven or a mesh band oven, fabricated potato chips were obtained. When the steel band oven was employed, the grooves were located downward.

As a result, the ones baked with the steel band showed no partially raised portion and had an appealing appearance with a stripe design and a texture.

Further, the ones baked with the mesh band showed no irregular blisters, and had an entirely very beautiful stripe pattern, with the thick portion being uniform and in a slightly hollowed state and the thin portion being completely free from hollowed state. Further, since the thick portion is in a slightly hollowed state, its texture was further improved than the ones baked by the steel band.

COMPARATIVE EXAMPLE 1

The same operation as in Example 1 was repeated until the compression and extension was conducted by a three-roll sheeter, and then a pair of flat rolls with the gap being adjusted to be 0.4 mm, was disposed, the above sheet was compressed and extended through the flat rolls, followed by stamping with a circular cutter for shaping. After shaping, the thickness of the sheet was entirely uniform and 0.9 mm.

The above sheet was baked by employing the steel band oven or mesh band oven under the same conditions as in Example 1, to obtain fabricated potato chips.

As a result, the ones baked with the steel band showed partially raised portions at the proportion of substantially 100%, and such portions were poor in the heat conduction and the drain of moisture, whereby the baked color was white and the texture was rigid. Further, 1 week after, 80% of the chips formed cracks.

Further, with the ones baked with the mesh band, the drain of water was poor, irregular hollowed blisters were formed, and the appearance and texture were both bad. Further, the blistered portions were broken by a slight shock.

TEST EXAMPLE 1

Organoleptic evaluations were carried out by eight professional panelists with respect to the potato chips of Example 1 and the potato chips of Comparative Example 1. The evaluations were made with 5 standards i.e. 1: poor, 2 slightly poor, 3: normal, 4: substantially good, 5: excellent, for the texture and appearance, respectively, and the average values thereof were determined. Table 2 shows the results of comparison of the ones baked by the steel band oven, and Table 3 shows the results of comparison of the ones baked by the mesh band oven.

TABLE 2

(ones baked by a steel band oven)

| Sample | Items of evaluation | A | B | C | D | E | F | G | H | Average |
| --- | --- | --- | --- | --- | --- | --- | --- | --- | --- | --- |
| Ex.1 | Texture | 4 | 4 | 4 | 5 | 5 | 4 | 5 | 5 | 4.5 |
|  | Appearance | 5 | 5 | 5 | 5 | 5 | 4 | 5 | 5 | 4.9 |
| Comp. Ex.1 | Texture | 3 | 2 | 2 | 2 | 2 | 1 | 3 | 2 | 2.1 |
|  | Appearance | 3 | 2 | 2 | 3 | 2 | 2 | 3 | 2 | 2.4 |

TABLE 3

(ones baked by a mesh band oven)

| Sample | Items of evaluation | A | B | C | D | E | F | G | H | Average |
| --- | --- | --- | --- | --- | --- | --- | --- | --- | --- | --- |
| Ex.1 | Texture | 5 | 5 | 5 | 5 | 5 | 4 | 5 | 5 | 4.9 |
|  | Appearance | 5 | 5 | 5 | 5 | 4 | 4 | 5 | 5 | 4.8 |
| Comp. Ex.1 | Texture | 2 | 2 | 2 | 2 | 3 | 2 | 3 | 3 | 2.4 |
|  | Appearance | 3 | 2 | 2 | 3 | 2 | 1 | 2 | 2 | 2.1 |

COMPARATIVE EXAMPLE 2

Before the stamping in Comparative Example 1, holes were formed with a dockering roll, and baking was carried out in the same manner as in Example 1 to obtain potato chips. The diameter of the docker pin was 1.2 mm, the holes were aligned in a checked pattern, the interval between adjacent holes arranged in line was 10 mm, and the interval between adjacent lines was 6 mm.

TEST EXAMPLE 2

Organoleptic evaluations were carried out in the same manner as in Test Example 1 with respect to the potato chips of Example 1 and the potato chips of Comparative Example 2. Table 4 shows the results of comparison of the ones baked by the steel band oven, and Table 5 shows the results of comparison of the ones baked by the mesh band oven.

TABLE 4

(ones baked by a steel band oven)

| Sample | Items of evaluation | A | B | C | D | E | F | G | H | Average |
| --- | --- | --- | --- | --- | --- | --- | --- | --- | --- | --- |
| Ex.1 | Texture | 4 | 4 | 4 | 5 | 5 | 4 | 5 | 5 | 4.5 |
|  | Appearance | 5 | 5 | 5 | 5 | 5 | 4 | 5 | 5 | 4.9 |
| Comp. Ex.2 | Texture | 4 | 4 | 4 | 4 | 5 | 3 | 4 | 5 | 4.1 |
|  | Appearance | 4 | 3 | 3 | 3 | 4 | 3 | 4 | 4 | 3.5 |

TABLE 5

(ones baked by a mesh band oven)

| Sample | Items of evaluation | A | B | C | D | E | F | G | H | Average |
| --- | --- | --- | --- | --- | --- | --- | --- | --- | --- | --- |
| Ex.1 | Texture | 5 | 5 | 5 | 5 | 5 | 4 | 5 | 5 | 4.9 |
|  | Appearance | 5 | 5 | 5 | 5 | 4 | 4 | 5 | 5 | 4.8 |
| Comp. Ex.2 | Texture | 5 | 4 | 5 | 4 | 5 | 4 | 4 | 5 | 4.5 |
|  | Appearance | 4 | 3 | 3 | 3 | 4 | 3 | 4 | 4 | 3.5 |

From the results of Tables 4 and 5, no significant difference was observed in the texture between Example 1 and comparative Example 1, but with the appearance, better evaluation result was admitted with substantial significance Example 1 having the grooves formed.

EXAMPLE 2

The materials to be incorporated as indicated in Table were put in a high-speed mixer and mixed at 1,000 rpm for 3 minutes to obtain a dough.

TABLE 6

| Sweet corn powder | 70 | parts by weiqht |
| --- | --- | --- |
| Potato starch | 25 | parts by weight |
| Drum dried α-waxy corn starch | 5 | parts by weight |
| Shortening | 5 | parts by weight |
| Salt | 0.5 | part by weight |
| Water | 90 | parts by weight |

The dough thus prepared was compressed and extended by a three-roll sheeter in the same manner as in Example 1. Then, using a flat roll and a grooved roll as in Example 1, the sheet was shaped into a grooved sheet as in Example 1.

By baking this sheet at 190° C. for 6 minutes employing a steel band oven or a mesh band oven, sweet corn chips were obtained.

The sweet corn chips had excellent texture and appearance as in the potato chips in Example 1.

EXAMPLE 3

The materials to be incorporated as indicated in Table 7 were put in a high-speed mixer and mixed at 1,000 rpm for 3 minutes to obtain a dough.

TABLE 7

| | | |
|---|---|---|
| Pumpkin powder | 80 | parts by weight |
| Potato starch | 17 | parts by weight |
| Drum dried α-waxy corn starch | 3 | parts by weight |
| Shortening | 4 | parts by weight |
| Salt | 0.5 | part by weight |
| Water | 90 | parts by weight |

The dough thus prepared was compressed and extended by a three-roll sheeter in the same manner as in Example 1. Then, using a flat roll and a grooved roll as in Example 1, the sheet was shaped into a grooved sheet as in Example 1.

By baking the sheet at 190° C. for 6 minutes employing a steel band oven or a mesh band oven, pumpkin chips were obtained.

The pumpkin chips had excellent texture and appearance as in the potato chips in Example 1.

As described above, according to the present invention, by forming grooves which reach the edge of a sheet in a predetermined interval on at least one side of the sheet, when baking is carried out by a steel band oven, the air remaining between the sheet and the steel band is allowed to run out through the grooves, whereby the formation of partially raised portions can be prevented at the time of baking. Further, when baking is carried out by a mesh band oven, since the thickness of the sheet is thin at the groove portion, a film due to the baking hardly forms at that portion and the moisture evaporated inside readily runs out at that portion, whereby the formation of random blisters can be prevented and it is possible to obtain a product having a uniform appearance wherein only the portions between the grooves are slightly hollowed and expanded like a bamboo or straw blind. Accordingly, it is possible to obtain low-fat fabricated chips excellent in the texture and appearance.

What is claimed is:

1. Fabricated chips produced by the method of:
   shaping a dough as a starting material into a sheet, wherein said dough contains at least 50% dried weight of a gelatinized starch material, and wherein said sheet has adjacent grooves; and
   baking the sheet by an oven, wherein on at least one side of the sheet, grooves which reach the edge of the sheet are formed in a predetermined interval, wherein portions between the grooves have a different thickness than the grooves, and wherein the portions are arranged linearly in parallel.

2. The fabricated chips according to claim 1, wherein the width of the grooves is from 0.5 to 12 mm, the depth of the grooves is from 0.2 to 3.0 mm, the width of a portion having no grooves formed thereon is at most 17 mm, and the thickness at the groove portion is from 0.3 to 2 mm.

3. The fabricated chips according to claim 2, wherein a portion between the grooves is expanded and the inside thereof is hollowed.

4. The fabricated chips according to claim 1, wherein a portion between the grooves is expanded and the inside thereof is hollowed.

5. Fabricated chips, each having a uniform shape, comprising:
   a sheet having adjacent grooves; and
   portions between the grooves wherein the portions have a different thickness than the grooves, and wherein the portions are arranged linearly in parallel.

6. A method for producing fabricated chips, which comprises:
   preparing a dough from a starting material which contains at least 50% dried weight of a gelatinized starch material;
   shaping the dough into a sheet such that on at least one side of the sheet, grooves which reach the edge of the sheet are formed in a predetermined interval;
   placing the sheet on a steel band such that the side having the grooves formed thereon is located downward; and
   heating the sheet, wherein the step of heating the sheet consists of a step of baking the sheet by an oven.

7. The method for producing fabricated chips according to claim 6, wherein the width of the grooves is from 0.5 to 12 mm, the depth of the grooves is from 0.2 to 3.0 mm, and the width of a portion having no grooves formed thereon is at most 17 mm.

8. The method for producing fabricated chips according to claim 6, wherein the thickness of the sheet at the groove portion is from 0.1 to 0.8 mm.

9. A method for producing fabricated chips, which comprises:
   preparing a dough from a starting material which contains at least 50% dried weight of a gelatinized starch material;
   shaping the dough into a sheet such that on at least one side of the sheet, grooves which reach the edge of the sheet are formed in a predetermined interval;
   placing the sheet on a mesh band; and
   heating the sheet, wherein the step of heating the sheet consists of a step of baking the sheet by an oven.

10. The method for producing fabricated chips according to claim 9, wherein the width of the grooves is from 0.5 to 12 mm, the depth of the grooves is from 0.2 to 3.0 mm, and the width of a portion having no grooves formed therein is at most 77 mm.

11. The method for producing fabricated chips according to claim 9, wherein the thickness of the sheet at the groove portion is from 0.1 to 0.8 mm.

* * * * *